Jan. 19, 1954 N. J. ROSENBURGH ET AL 2,666,596
FILM ALARM SYSTEM FOR PHOTOGRAPHIC APPARATUS
Filed April 5, 1952 3 Sheets-Sheet 3

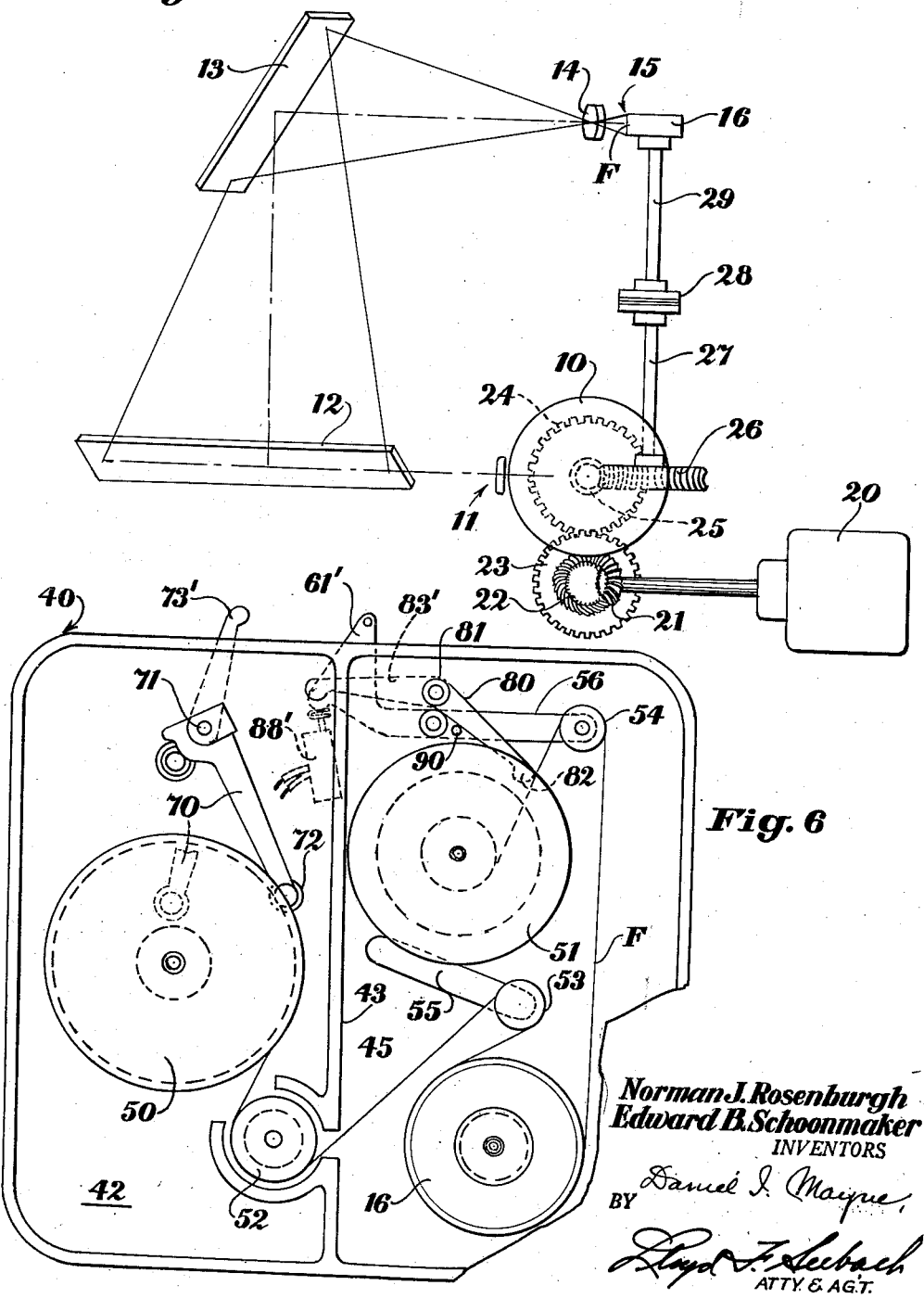

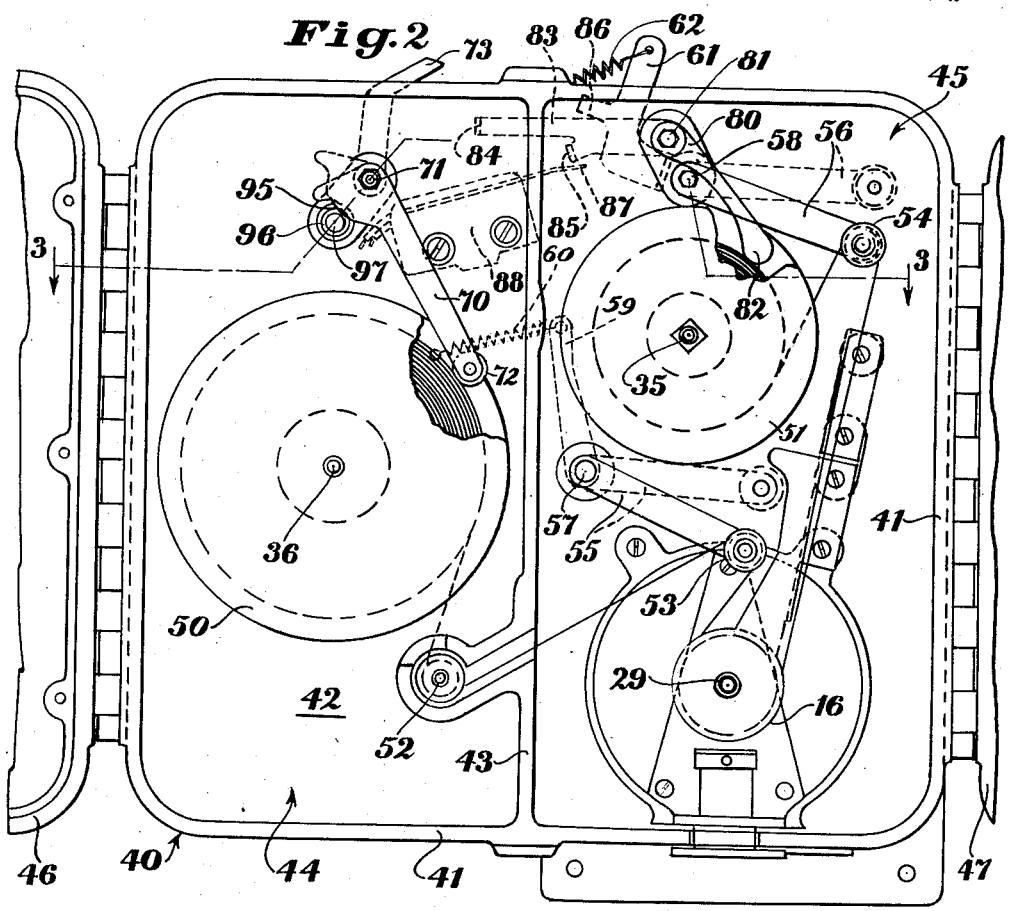
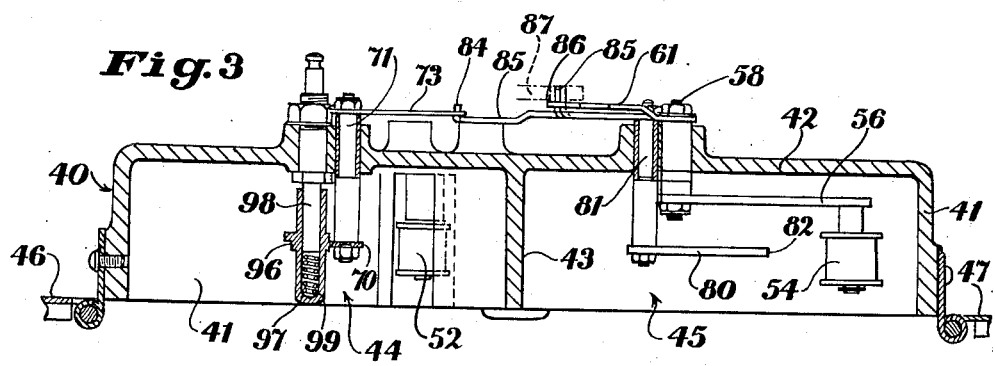

Norman J. Rosenburgh
Edward B. Schoonmaker
INVENTORS

BY

ATTY. & AGT.

Patented Jan. 19, 1954

2,666,596

UNITED STATES PATENT OFFICE 2,666,596

FILM ALARM SYSTEM FOR PHOTOGRAPHIC APPARATUS

Norman J. Rosenburgh and Edward B. Schoonmaker, Rochester, N. Y., assignors to Eastman Kodak Company, Rochester, N. Y., a corporation of New Jersey Application April 5, 1952, Serial No. 280,824

7 Claims. (Cl. 242—57)

This invention relates to photographic apparatus and more particularly to an arrangement of members associated with and actuated by the film strip to indicate through actuation of a single member the condition of the film on and between the film reels supporting the film strip.

In photographic copying apparatus, for instance, it is well-known to provide an alarm device which is actuated by depletion of the film on the supply reel, by a full take-up reel, or by loss of film tension between the supply and take-up reels. Although a single alarm device is energized by any one of the aforementioned conditions, it is accomplished in each instance by separate switches which are usually arranged in parallel circuit with respect to each other, the group being in series circuit with the alarm device. Also, in such apparatus each film unit contains its own set of switches and upon removal of the film unit from the apparatus, the switches are removed therewith and separated from the alarm device.

In the present invention, the film unit is built into the apparatus so that only the film reels are removed. As a result, a novel arrangement of actuating members has been devised to actuate a single switch means in series circuit with the alarm device, the switch means being actuated solely or severally by the condition of the film strip on and/or between the film reels. The alarm system comprises a bell-crank lever associated with the supply reel, a second bell-crank lever associated with the take-up reel, a third bell-crank lever associated with the film strip between the reels, and a single switch means arranged with respect to said levers so that it is actuated to a closed position solely and severally by the actuating portions of said levers. The levers associated with the take-up reel and film strip are interconnected so that upon loss of film tension the take-up reel lever will be moved by the lever associated with the film strip to a position beyond the periphery of the reel to facilitate adjustment of the film strip, threading of the film strip onto the reel, or removal of the film reel from its spindle. This movement is independent of the movement of the take-up reel bell-crank lever to its actuating position by the increasing convolutions of film on the reel. Since only the reels are removable from the apparatus, each lever will maintain the switch in a closed position until a film strip is properly arranged in the apparatus. A single switch means, therefore, completes the alarm circuit upon any one or all conditions of the film strip on or between the film reels.

The primary object of the invention, therefore, is to provide in a photographic apparatus an alarm device which includes a single switch means adapted to be actuated to a closed position solely and severally by members associated with the supply reel, take-up reel, and film strip between said reels upon depletion of the film supply, a full take-up reel, or loss of film tension.

Another object of the invention is to provide in a photographic apparatus an arrangement of alarm actuating members associated with the film strip and take-up reel which are movable as a unit upon loss of film tension to a position for actuating a single switch means and in which position the member associated with the take-up reel is free of said reel to permit threading the film therein or to permit removal of said reel.

A further object of the invention is to provide in a photographic apparatus an alarm device including a single switch means and a system of levers adapted to be moved independently or collectively by the convolutions of film on the film reels and loss of tension in the film strip to a predetermined position for actuating said switch means.

And still another object of the invention is to provide in a photographic apparatus an alarm device including a single switch means and a bell-crank lever associated with the supply reel, a second bell-crank lever associated with the take-up reel and a third bell-crank lever associated with the film strip, said levers being movable by the film strip to a position for actuating the switch means to a closed position solely or severally and said second bell-crank lever being moved with said third bell-crank lever independently of the film strip upon loss of tension in said film strip.

These and other objects and advantages will be apparent to those skilled in the art by the description which follows.

Reference is now made to the accompanying drawings wherein like reference numerals designate like parts and wherein:

Fig. 1 is a diagrammatic side elevation of a document copying apparatus to which the invention has been adapted;

Fig. 2 is a plan view of the film chamber showing the preferred relation of the various elements with respect to the film reels and the film drive roll;

Fig. 3 is a vertical section taken substantially on line 3—3 of Fig. 2;

Fig. 6 is a plan view of the film chamber showing a second embodiment of the invention.

Figure 4:
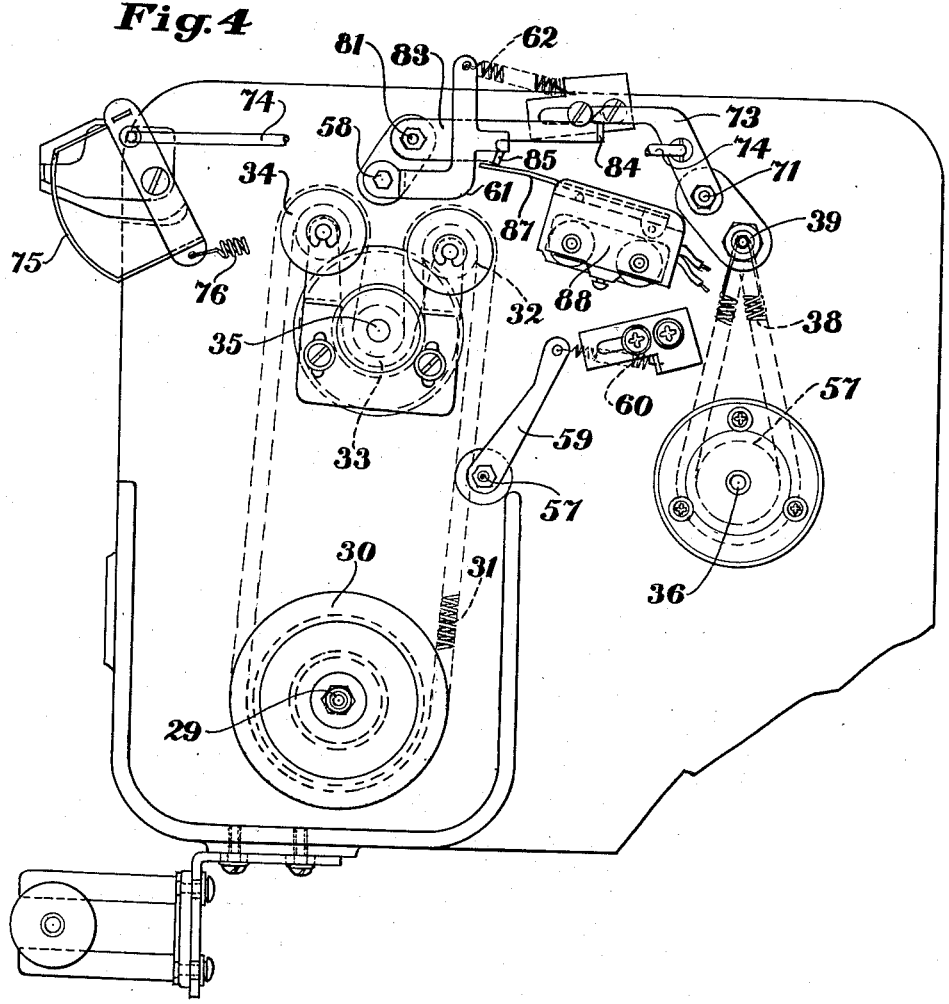
Fig. 4 is a bottom view of the film chamber showing the drive connecting the film drive roll shaft and take-up spindle and the arrangement of the switch actuating members with respect to the switch means.
Figure 5:
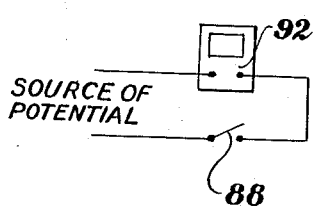
Fig. 5 is a simple wiring diagram showing a buzzer in series circuit with the switch means.

With reference to Fig. 1, the document to be photographed is moved by drum 10 past the photographing station 11 to a suitable receptacle positioned on the underside of said drum. The document is illuminated at photographing station 11 by suitable lamps and the transverse reflected document image is directed by mirrors 12 and 13 into projection lens 14 which, in turn, projects the image onto the film F which is moved through the film plane in the exposure station 15 by the film drive roll 16 in synchronism with the movement of the document. Drum 10 is driven by motor 20 through bevel gears 21 and 22 and spur gears 23 and 24. Worm 25 on the drum axis meshes with worm wheel 26 on shaft 27 and through clutch 28 drives shaft 29 and film drive roll 16. The control of clutch 28 by fingers arranged in the document path is well-known and forms no part of the present invention. Such a photographic copying device, as disclosed in Fig. 1, is, however, described in the co-pending application, Serial No. 218,215, filed March 29, 1951, in the name of N. J. Rosenburgh. The film plane of the apparatus, therefore, coincides with the focal plane of projection lens 14 and film drive roll 16 moves the film strip through said film plane in a manner described hereinafter and is to be considered as the film advancing means. The drive means for film drive roll 16 comprises motor 20, the gear trains connecting the motor shaft 27, and clutch means 28 which connects the drive with film drive roll 16. As shown in Fig. 4 pulley 30 is secured to shaft 29 beneath drive roll 16 and by means of spring belt 31 which encircles pulleys 32, 33 and 34 drives take-up spindle 35 to which is secured pulley 33. The supply spindle 36 is braked in its movement to prevent feeding off of excess film by pulley 37 fixed to spindle 36 and encircled by a resilient coil spring 38 having its ends anchored at 39.

The film chamber 40 in which the film handling means is located comprises side walls 41, bottom wall 42 and a partition 43 which divides said chamber into supply chamber 44 and take-up chamber 45, see Fig. 2. The respective chambers are covered by hinged doors 46 and 47.

The film handling means comprises rotatable members, or reels, 50 and 51 which are mounted on spindles 35 and 36 to support the film strip and a plurality of rollers 52, 53 and 54 which are arranged between each rotatable member, or reel, and the film drive roller 16. Roller 52 is fixed in position and rollers 53 and 54 are rotatably mounted on arms 55 and 56, respectively, said arms being pivotally mounted on shafts 57 and 58 which are journaled in bottom wall 42, see Fig. 3. On the under side of wall 42, shaft 57 has fixed thereto lever 59 to which is secured spring 60 for normally holding arm 55 and roller 53 in the position indicated by dotted lines in Fig. 2. Likewise, shaft 58 has secured thereto on the under side of wall 42 lever 61 to which is secured spring 62 for normally holding arm 56 and roller 54 in the position indicated by dotted lines in Fig. 2. Arms 55 and 56 together with their respective levers and rollers comprise film engaging members or bellcrank levers. When film F is threaded from reel 50 to reel 51, the film is passed around roller 52, roller 53, film drive roller 16 and roller 54, the end of the film strip being secured to the hub of reel 51 in any well-known manner. Accordingly, the film strip holds arms 55 and 56 and their respective rollers in the full-line positions as shown in Fig. 2, and against the action of their respective springs for tensioning the film strip and maintaining it in engagement with film drive roller 16. Also, the rollers define the film path through which the film is moved by roller 16 from reel 50 to reel 51, roller 16 engaging a portion of the film strip between said reels or rotatable members.

The pivotally mounted members comprise a system of levers associated with the supply and take-up reels. Such members on the supply reel comprise an arm 70 in chamber 44 secured at one end to shaft 71 journaled in wall 42 and carrying roller 72 at the other end for engaging the convolutions of film on the supply reel 50. The other end of shaft 71, which extends to the under side of wall 42, has secured thereto lever 73 which is connected by rod 74 to a footage scale 75, see Fig. 4, the spring 76 which is connected to scale 75 maintaining roller 72 in engagement with the outer convolution of film on reel 50 and moving roller 72, arm 70 and lever 73 in a clockwise direction as the convolutions decrease in number due to movement of the film strip to take-up reel 51. This movement of roller 72 toward the core of reel 50, or the position indicated in dotted lines in Fig. 2, is transmitted to scale 75 for continuously indicating the amount of film on the supply reel. With respect to the take-up reel, such members comprise an arm 80 in chamber 45 secured at one end to shaft 81 journaled in wall 42 and having the other end 82 adapted to engage the convolutions of film on the take-up reel 51. On the under side of wall 42, a lever 83 is secured to shaft 81 and is provided with spaced extensions 84 and 85, the extension 84 lying in the path of lever 73 and the extension 85 lying in the path of extension 86 on lever 61. Extension 85 is also arranged to engage the switch arm 87 of switch 88. Arm 80 is maintained in a definite position with respect to the convolutions of film on reel 51 by the engagement of extensions 85 and 86, as shown in Fig. 2, until the convolutions engage end 82 and the increasing convolutions move arm 80 toward the periphery of reel 51.

With the film strip threaded as shown in Fig. 2, the film is moved intermittently, the movement depending on the length of document being fed or may, when documents are fed from a stack, be moved continuously through the film plane of exposure station 15 by roller 16. As the convolutions decrease, on reel 50, arm 70 and lever 73 are moved in a clockwise direction as spring 76 maintains roller 72 in engagement with the film convolutions. As the supply of film approaches the core of the reel, arm 73 engages extension 84 of lever 83 to move it in a counter-clockwise direction until extension 85 engages switch arm 87 and actuates switch 88 to a closed position to complete the circuit through buzzer 92. The predetermined position of lever 73 with respect to lever 73 with respect to lever 83 and switch 87 in its contact closing position is such that some film still remains on the reel and serves to warn the operator that copying should be discontinued, the remaining film being wound to the take-up reel to protect the previously exposed film from fogging.

The arm 70 is provided at its pivoted end with an arcuate cut-out 95 which engages shoulder 96 on sleeve 97 which is slidably mounted on stud 98 and urged toward cover 46 by spring 99. In order to remove or place reel 50 on spindle 36, arm 70 must be moved to a position so that roller 72 clears the periphery of reel 50. In this position, the top surface of shoulder 96 is cleared by edge 100 on lever 70 and spring 99 urges sleeve 97 outwardly so that shoulder 96 engages cutout 95 to hold arm 70 in a position beyond reel 50. When a reel has been placed on spindle 36 and/or cover 46 is closed, a boss, not shown, on cover 46 moves sleeve 97 toward wall 42 and against the action of spring 99 to displace shoulder 96 to a position below lever 70. When this occurs, spring 76 through rod 74 and lever 73 rotates lever 70 and moves roller 72 into engagement with the film on the reel.

As the convolutions on reel 51 increase beyond the point where end 82 engages said convolutions, arm 80 and lever 83 are moved in a counter-clockwise direction until extension 85 engages switch arm 87 and moves it to its switch closing position to energize buzzer 92. If at any time during the movement of the film from reel 50 to 51, the film should break or there is loss of film tension between the reels, arm 56 will be moved by spring 62 through lever 61 in a counter-clockwise direction and extension 86 will engage extension 85 to move it against switch arm 87 for closing switch 88 to energize buzzer 92. At the same time, engagement of extension 86 with extension 85 through lever 61 rotates arm 80 to a position so that end 82 is beyond the periphery of reel 51.

With this arrangement, arm 70 and lever 73, arm 80 and lever 83, and arm 56 and lever 61 provide, in effect, a system of bell-crank levers which are capable of actuating switch 88 either independently of each other or severally to indicate the condition of the film strip on and between reels 50 and 51. When there is no film in chamber 40, arm 73 will be in engagement with extension 84, extension 86 of arm 61 will be in engagement with extension 85 which, in turn, will have actuated switch 88 to a closed position, see Fig. 4. Accordingly, switch 88 is held in the closed position by each lever system and is not released until the film has been properly threaded from one reel to the other, as shown in Fig. 2.

In Fig. 6 an arrangement similar to that shown in the preferred embodiment is utilized but in which each system of levers is capable of actuating switch 88' solely and severally. In this arrangement, levers 61' and 73' actuate the switch directly rather than through arm 83' of the other lever system 80 and 83'. Pin 90 on lever 56 maintains arm 80 in a position for engaging the convolutions upon reaching a predetermined number and also moves arm 80 therewith to a position beyond the periphery of reel 51 upon loss of film tension irrespective of the amount of film on reel 51. As described hereinbefore, switch 88' is actuated to a closed position by arm 73' when lever 70 reaches a predetermined position as determined by the decreasing convolutions of film on reel 50, by arm 83' when lever 80 reaches a predetermined position with respect to the increasing convolutions of film on reel 51, and by lever 61' upon movement of arm 56 to a predetermined position because of loss of film tension or breakage of the film strip.

Since other modifications of the invention will be suggested to those skilled in the art, the scope of the invention is not to be limited in any respect by the present disclosure but is defined in the appended claims.

Having now particularly described our invention, what we desire to secure by Letters Patent of the United States and what we claim is:

1. In photographic apparatus having a film plane, the combination with film handling means including two spaced rotatable members for supporting a film strip and film advancing means including a member adapted to engage a portion of said film strip between said rotatable members for movement thereof through said film plane from one to the other of said rotatable members, of film engaging means adapted to engage a portion of said film strip between said rotatable members for maintaining said film strip under tension and in engagement with said member and to be movable to a predetermined position upon loss of tension in said film strip, a movable member having a portion adapted to engage the outer convolution of the film strip on one of said rotatable members and movable to a predetermined position as said convolutions decrease, a second movable member having a portion adapted to engage the outer convolution of the film strip on said other rotatable member when said convolutions have reached a predetermined number and movable to a predetermined position as said convolutions increase, and means including an alarm and responsive to any one of said film engaging means, movable member and second movable member and adapted to be actuated to an operative position solely and severally by said film engaging means, movable member and second movable member in said predetermined position for indicating conditions of said film strip on and between said rotatable members.

2. In photographic apparatus having a film plane, the combination with film handling means including two spaced rotatable members for supporting a film strip and film advancing means including a film drive roll adapted to engage a portion of said film strip between said rotatable members for movement thereof through said film plane from one to the other of said rotatable members, of film engaging members adapted to engage a portion of said film strip between each of said rotatable members and said film drive roll for maintaining said film strip under tension and in engagement with said film drive roll, one of said film engaging members being movable to a predetermined position upon loss of tension in said film strip, a pivotally mounted member having a portion adapted to engage the outer convolution of the film strip on one of said rotatable members and movable to a predetermined position as said convolutions decrease, a second pivotally mounted member having a portion adapted to engage the outer convolution of the film strip on said other rotatable member when said convolutions have reached a predetermined number and movable to a predetermined position as said convolutions increase, and means including an alarm and responsive to any one of said film engaging member, pivotally mounted member and second pivotally mounted member and adapted to be actuated to an operative position solely and severally by said film engaging member, pivotally mounted member and second pivotally mounted member in said predetermined position for indicating conditions of said film strip on and between said rotatable members.

3. In photographic apparatus having a film plane, the combination with film handling means including two spaced rotatable members for supporting a film strip, and film advancing means including a member adapted to engage a portion of said film strip between said rotatable members for movement thereof through said film plane from one to the other of said rotatable members, of film engaging members arranged between each rotatable member and said film advancing means to define a film path between said rotatable members for maintaining said film strip under tension and in engagement with said member, one of said film engaging members being movable to a predetermined actuating position upon loss of tension in said film strip, a pivotally mounted member having a portion adapted to engage the outer convolution of the film strip on one of said rotatable members and movable to a predetermined actuating position as said convolutions decrease, a second pivotally mounted member having a portion adapted to engage the outer convolution of the film strip on said other rotatable member when said convolutions have reached a predetermined number and movable to a predetermined actuating position as said convolutions increase, and a circuit including an alarm means and a single switch means arranged with respect to said one film engaging member and said pivotally mounted members for actuation to a position solely and severally by said members when in said actuating positions for completing said circuit to energize said alarm device and for indicating conditions of said film strip on and between said rotatable members.

4. In photographic apparatus having a film plane, the combination with film handling means including two spaced rotatable members for supporting a film strip, and film advancing means including a member adapted to engage a portion of said film strip between said rotatable members for movement thereof through said film plane from one to the other of said rotatable members, of film engaging members arranged between each rotatable member and said film advancing means to define a film path between said rotatable members for maintaining said film strip under tension and in engagement with said member, one of said film engaging members having an actuating means movable therewith to a predetermined position upon loss of tension in said film strip, a supply indicating means adapted to engage the outer convolution of the film strip on the rotatable member from which the film strip is being removed and including an actuating means movable therewith to a predetermined position as said convolutions decrease, a take-up indicating means adapted to engage the outer convolution of the film strip on the rotatable member on which said film strip is being wound when said convolutions have reached a predetermined number and including an actuating means movable therewith to a predetermined position as said convolutions increase, and a circuit including an alarm means and a single switch means arranged with respect to said actuating means and adapted to be actuated to a position solely and severally by said actuating means when in said predetermined positions for completing said circuit to energize said alarm means and for indicating conditions of said film strip on and between said rotatable members.

5. In photographic apparatus having a film plane, the combination with film handling means including two spaced rotatable members for supporting a film strip, and film advancing means including a member adapted to engage a portion of said film strip between said rotatable members for movement thereof through said film plane from one to the other of said rotatable members, of film engaging members arranged between each rotatable member and said film advancing means to define a film path between said rotatable members for maintaining said film strip under tension and in engagement with said member, one of said film engaging members having an actuating member movable therewith to a predetermined position upon loss of tension in said film strip, a supply indicating means adapted to engage the outer convolution of the film strip on the rotatable member from which the film strip is being removed and including an actuating member movable therewith to a predetermined position as said convolutions decrease, a take-up indicating means adapted to engage the outer convolutions of the film strip on the rotatable member on which said film strip is being wound when said convolutions have reached a predetermined number and including an actuating member movable therewith to a predetermined position as said convolutions increase, a circuit including an alarm means and a single switch means arranged with respect to said actuating members for actuation to a position solely and severally by said members when in said predetermined positions for completing said circuit to energize said alarm means and for indicating conditions of said film strip on and between said rotatable members, and means carried by said one film engaging member for engaging said take-up indicating means to maintain said take-up indicating means in position for engaging said predetermined number of film convolutions and to move said take-up indicating means therewith upon movement to said predetermined position independently of said convolutions on the rotatable member.

6. In photographic apparatus having a film plane, the combination with film handling means including two spaced rotatable members for supporting a film strip, film advancing means including a rotatable member adapted to engage a portion of said film strip between said rotatable members for movement thereof through said film plane from one to the other of said rotatable members, and drive means operatively connected to said film advancing means for moving said film strip and for imparting rotation to the rotatable member on which said film strip is being wound, of film engaging members arranged between each rotatable member and said film advancing means to define a film path between said rotatable members, said film engaging members being pivotally mounted and biased for maintaining said film strip under tension and in engagement with said rotatable member, an actuating member operatively connected to one of said film engaging members and movable therewith upon loss of film tension to a predetermined position, a pivotally mounted member including an arm having a portion adapted to engage the outer convolution of the film strip on one of said rotatable members and movable toward the core of said rotatable member as said convolutions decrease and an actuating member operatively connected to said arm and movable therewith to a predetermined position, a second pivotally mounted member including an arm having a portion adapted to engage the outer convolution of the film strip on the other of said rotatable members when said convolutions have reached a predetermined number and movable toward the periphery of said rotatable member as said convolutions increase and an actuating member operatively connected to said arm and movable therewith to a predetermined position and having extensions adapted to be engaged by the actuating members of said one film engaging member and said first-mentioned pivotally mounted member during a portion of their movement toward said predetermined positions for moving the actuating member of said second pivotally mounted member position independently of said film convolutions, and a circuit including an alarm means and a single switch means arranged in series circuit and with respect to one of said extensions and adapted to be actuated thereby to a position solely or severally by said actuating members in said predetermined positions for completing said circuit to energize said alarm means and to indicate conditions of said film strip on and between said rotatable members.

7. In photographic apparatus having a film plane, the combination with a casing having a wall, film handling means including two spaced rotatable members arranged on one side of said wall for supporting a film strip, film advancing means including a film drive roll adapted to engage a portion of said film strip between said rotatable members for movement thereof through said film plane from one to the other of said rotatable members, and drive means operatively connected to said film advancing means for moving said film strip and for imparting rotation to the rotatable member on which said film strip is being wound, of film engaging members arranged between each rotatable member and said film advancing means to define a film path between said rotatable members, said film engaging members being pivotally mounted and biased for maintaining said film strip under tension and in engagement with said film drive roll, an actuating member arranged on the other side of said wall and operatively connected to one of said film engaging members and movable therewith to a predetermined position upon loss of film tension, a pivotally mounted bell-crank lever comprising an arm having a portion adapted to engage the outer convolution of the film strip on one of said rotatable members as said convolutions decrease and an actuating member arranged on the other side of said wall and operatively connected to said arm for movement therewith to a predetermined position, a second pivotally mounted bell-crank lever comprising an arm having a portion adapted to engage the outer convolution of the film strip on the other of said rotatable members when said convolutions have reached a predetermined number and movable toward the periphery of said rotatable member as said convolutions increase and an actuating member arranged on the other side of said wall and operatively connected to said arm for movement therewith to a predetermined position and having extensions adapted to be engaged by the actuating members of said one film engaging member and of said first-mentioned bell-crank lever during the latter portion of their movement toward said predetermined positions for moving the actuating member of said second bell-crank lever to its predetermined position independently of said film convolutions, a circuit including an alarm means and a single switch means arranged in series circuit and with respect to one of said extensions for actuation thereby to a position solely or severally by said actuating members in said predetermined positions for completing said circuit to energize said alarm means for indicating conditions of said film strip on and between said rotatable members, and an extending member carried by said one film engaging member for engaging the arm of said second bell-crank lever to maintain said arm in position for engaging said predetermined number of convolutions and for moving said second bell-crank lever therewith upon movement to said predetermined position independently of the convolutions on said rotatable member.

NORMAN J. ROSENBURGH.
EDWARD B. SCHOONMAKER.

References Cited in the file of this patent
UNITED STATES PATENTS

| Number | Name | Date |
|---|---|---|
| 1,068,119 | Foote | July 22, 1913 |
| 1,804,340 | Hoffman et al. | May 5, 1931 |
| 2,493,340 | Cohen et al. | Jan. 3, 1950 |